United States Patent [19]

Thiene

[11] 4,227,131

[45] Oct. 7, 1980

[54] AUTOMATIC RETURN FOR PATIENT CHAIR

[75] Inventor: Paul G. Thiene, Laguna, Calif.

[73] Assignee: Surgical Mechanical Research, St. Louis, Mo.

[21] Appl. No.: 22,203

[22] Filed: Mar. 19, 1979

[51] Int. Cl.[3] .............................................. H02P 3/08

[52] U.S. Cl. .................................... 318/467; 318/468; 318/430

[58] Field of Search ............... 318/650, 787, 467, 568, 318/468, 430, 282; 297/330

[56] References Cited

U.S. PATENT DOCUMENTS

| | | | |
|---|---|---|---|
| 3,573,579 | 4/1971 | Lewus | 318/787 |
| 3,993,940 | 11/1976 | Volk, Jr. | 318/468 X |
| 4,128,797 | 12/1978 | Murata | 318/568 X |
| 4,158,160 | 6/1979 | Meiller | 318/467 |

*Primary Examiner*—B. Dobeck

*Attorney, Agent, or Firm*—Harness, Dickey & Pierce

[57] ABSTRACT

A control circuit for an electrically adjustable patient chair that is adapted when actuated by the momentary depression of a start button, to automatically return the chair to its fully down and tilt forward position. The control circuit includes a multiple-pole relay that is latched in the closed position to energize both motor windings by a solid state switching device that is gated to the on state by a current transformer that senses the load current in a conductor that passes through the core of the transformer. The adjustment motors remain energized until a pair of limit switches are opened upon the chair attaining its exit position. The resulting current drop to zero in the load line is sensed by the current transformer which turns off the solid state switching device which in turn unlatches the relay. Thus, it will be appreciated that the present control circuit automatically "resets" itself after the chair has returned to its fully down and tilt forward position so as to permit normal operation of the height and tilt adjustment motors.

10 Claims, 1 Drawing Figure

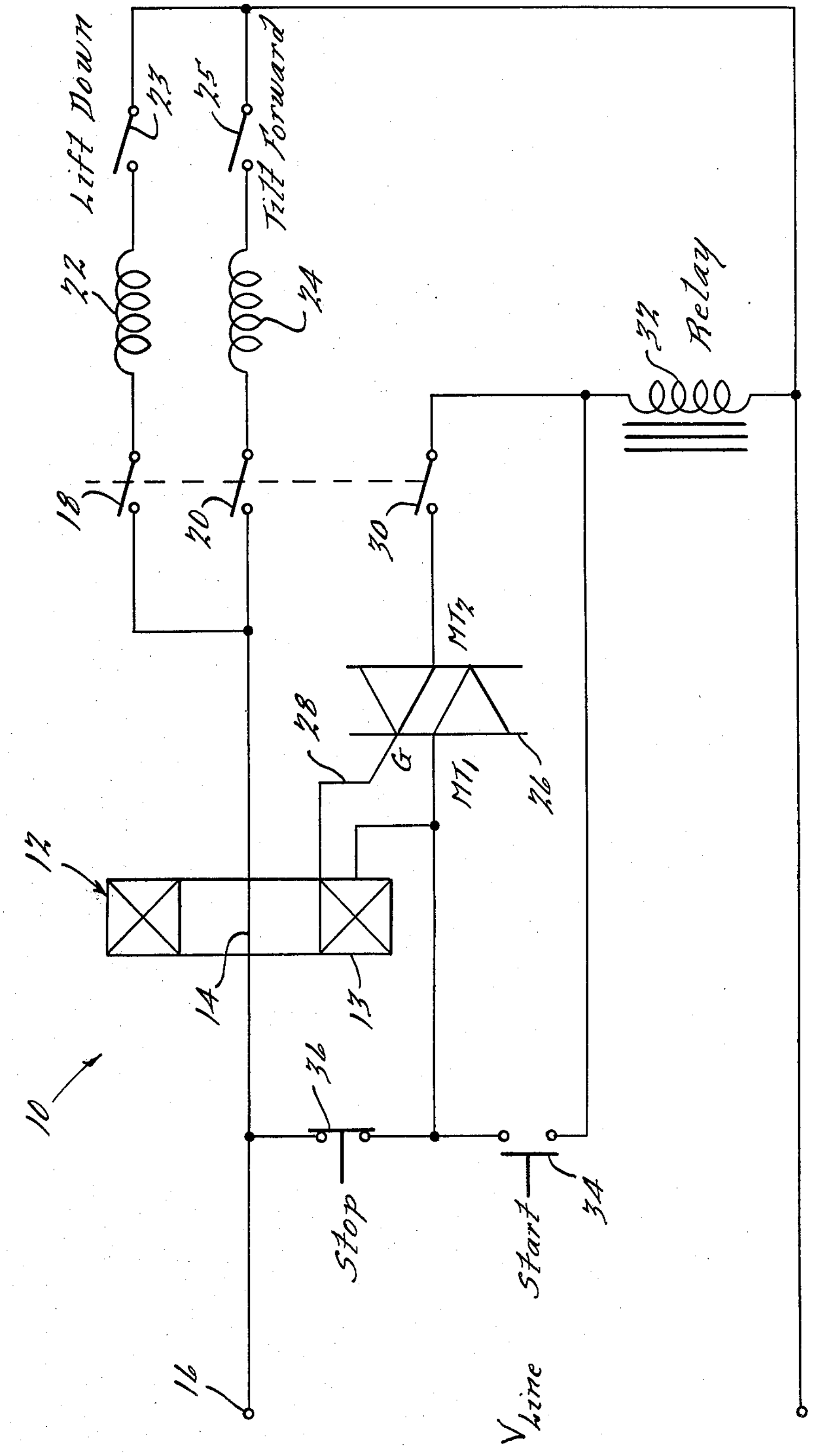
Lift Down
23
25
Tilt Forward
22
24
Relay
32
18
20
30
MT2
MT1
G
28
26
12
14
13
10
36
Stop
Start
34
16
V Line

AUTOMATIC RETURN FOR PATIENT CHAIR

BACKGROUND AND SUMMARY OF THE INVENTION

The present invention relates to a control circuit for an electrically adjustable patient chair and in particular to a circuit that is adapted when activated to automatically return the chair to its normal tilt-forward and lift-down position.

Patient chairs utilized in medical and dental offices typically have electrical height and tilt controls. It is therefore desirable to provide a control circuit for automatically returning the chair to its exit position without having to hold the lift-down and tilt-forward return switches. Several approaches to this problem are possible.

The simplist method, of course, is simply to install a maintain double-pole switch in parallel with the lift-down and tilt-forward return switches which when closed will energize the height and tilt adjustment motors until the motor limit switches deenergize the respective motor windings. However, with this approach the user must remember to reset the maintain switch to its off position before the height and tilt controls can again be utilized.

Another approach which automatically performs the reset function involves the use of a double-pole relay in place of the maintain switch and a timer that is adapted to time-out and unlatch the relay after a period of time sufficiently long to permit the chair to return to the exit position from its extreme up and back positions. However, with this approach, the normal height and tilt control switches are inoperable for a given period of time, regardless of how close the chair is the exit position when the automatic return is activated. In addition, timer circuits capable of delay times of sufficient duration for this purpose can be quite expensive.

The present invention however proposes to solve these problems by providing a logic circuit that senses the current to the windings of the height and tilt adjustment motors and unlatches the relay when the current falls to zero. More particularly, the present control circuit utilizes a current transformer that senses the current through the motor windings and removes the bias signal to the gate of a solid state switching device when the current through the windings goes to zero. The solid state switching device, which is connected in series with the relay coil, is thereby turned off, deenergizing the relay coil and opening the double-pole relay contacts connected in series with the motor windings. In this manner, the control circuit is automatically reset when the chair attains its exit position.

Thus, it will be seen that a highly simplified, inexpensive logic circuit is provided that permits a patient chair having electrical height and tilt controls to be automatically returned to its exit position simply by momentarily depressing a single switch. In addition, the present control circuit is designed to be easily incorporated into the electrical system of the chair without having to significantly modify the existing wiring or adding additional leads from the height and tilt adjustment motors.

Additional objects and advantages of the present invention will become apparent from a reading of the detailed description of the preferred embodiment which makes reference to the following drawing in which is shown a circuit diagram of a control circuit according to the present invention.

DETAILED DESCRIPTION OF THE PREFERRED EMBODIMENT

Referring to the drawing, a circuit diagram of a control circuit 10 according to the present invention is shown. The control circuit 10 is adapted upon depression of the START switch 34 to energize both the height and tilt motor windings 22 and 24 respectively, until the limit switches 23 and 25 are opened indicating that the chair has been returned to its "exit" or lift-down and tilt-forward position. In addition, the present control circuit 10 is adapted to automatically "reset" itself so that the height adjustment and tilt adjustment switches (not shown) respectively, can be utilized after the chair has been returned to its exit position without having to manually reset the START switch 34.

The control circuit 10 includes a current transformer 12 which comprises a toroidal-shaped inductor having a conductor 14 running through the center of the core. The conductor 14 connects the power source 16 to the windings of the height and tilt adjustment motors 22 and 24 respectively, through a pair of relay contacts 18 and 20. The secondary 13 of the current transformer 12 is connected between the power source 16 and the gate terminal (G) of an electronic switching device 26, herein a TRIAC. The main terminals MT1 AND MT2 respectively, of the TRIAC 26 are connected to the power source 16 through a normally-closed STOP switch 36 and to the relay coil 32 through another set of relay contacts 30. The relay coil 32 is also connected to the power source 16 through the normally-open START switch 34 and the STOP switch 36.

The circuit 10 operates in the following manner. When the START switch 34 is closed, the relay winding 32 is energized, thereby closing relay contacts 18, 20 and 30 and applying power to both the height and tilt adjustment motor windings 22 and 24. The load current flowing in conductor 14 through the current transformer 12 causes the secondary 13 of current transformer 12 to produce a signal that is applied to the gate (G) of the TRIAC 26 thereby rendering the TRIAC conductive. With the TRIAC 26 switched to its ON state, it will be appreciated that the START button 34 can be released with deenergizing the relay coil 32. Thus, the height and tilt motor windings 22 and 24 will remain energized until the limit switches 23 and 25 are opened upon the chair attaining its fully down and tilt forward position. When both limit switches 23 and 25 have opened, the current flowing through conductor 14 will drop to zero, resulting in the termination of the gate signal to the TRIAC 26. TRIAC 26 is accordingly rendered non-conductive, thereby deenergizing the relay coil 32 and opening the relay contacts 18, 20 and 30.

Thus, it can be seen that the present control circuit 10 is adapted to automatically "reset" itself by sensing the current through the load line and "unlatching" the relay when the current in the line falls to zero. As a result, once the chair is returned to the exit position, normal control of the height and tilt adjustment motors is restored.

Finally, it will be noted that the STOP button 36 is included to provide a means of manually unlatching the relay in the event of a problem or emergency. In addition, it will be appreciated that relay contacts 30 are not essential to the operation of the circuit 10, but rather are provided to prevent spurious triggering of the TRIAC 26 by line transients.

While the above description constitutes the preferred embodiment of the present invention, it will be appreciated that the invention is susceptible to modification, variation and change without departing from the proper scope or fair meaning of the accompanying claims.

What is claimed is:

1. A control circuit for a chair having at least one motor for electrically adjusting the position of the chair, which is adapted to automatically return the chair to a predefined position, comprising:

switching circuit means for energizing said motor in response to a start signal, first switch means for deenergizing said motor when the chair has attained said predefined position, and current sensing means for sensing the load current to said motor and producing a first signal in accordance therewith, said switching circuit means being additionally responsive to said first signal for maintaining said motor energized until said motor is deenergized by said first switch means.

2. The control circuit of claim 1 wherein said switching circuit means has set and reset states and said switching circuit means is automatically switched to its reset state in response to the absence of said first signal.

3. The control circuit of claim 2 wherein said switching circuit means includes second switch means having first and second states and being responsive to said start signal to switch said second switch means into said first state and thereby provide current to energize said motor.

4. The control circuit of claim 3 wherein said switching circuit means further includes third switch means responsive to said first signal for maintaining said second switch means in said first state until said current sensing means terminates production of said first signal upon the deenergization of said motor by said first switch means.

5. The control circuit of claim 4 wherein said current sensing means comprises a current transformer having a toroidal-shaped core with the load line to said motor passing through said core and a secondary winding for producing said first signal in accordance with the current passing through said load line.

6. A control circuit for a chair having at least one motor for electrically adjusting the position of the chair, which is adapted to automatically return the chair to a predefined position, comprising:

first switch means having first and second states and being responsive to a start signal to switch said first switch means into said first state and thereby provide current to energize said motor, second switch means for deenergizing said motor when the chair has attained said predefined position, current sensing means for sensing the load current to said motor and producing a first signal in accordance therewith, and third switch means responsive to said first signal for maintaining said first switch means in said first state until said current sensing means terminates production of said first signal upon the deenergization of said motor by said second switch means.

7. The control circuit of claim 6 wherein said current sensing means comprises a current transformer having a toroidal-shaped core with the load line to said motor passing through said core and a secondary winding for producing said first signal in accordance with the current passing through said load line.

8. The control circuit of claim 7 wherein said switch means comprises a relay having a pair of contacts connected to said motor and a coil energizable by said start signal and by said third switch means.

9. The control circuit of claim 8 wherein said third switch means comprises a solid state switching device having a control terminal connected to said secondary winding of said current transformer and first and second main terminals connected between a power source and said relay coil, said solid state switching device being rendered conductive whenever said first signal is produced.

10. The control circuit of claim 9 wherein the chair has a height control motor and a tilt control motor and said current transformer is adapted to produce said first signal to maintain said solid switching device conductive until both said height and tilt control motors are deenergized.

* * * * *